United States Patent [19]

Lasher

[11] 4,071,578

[45] Jan. 31, 1978

[54] ONE-COAT POLYESTER-BASED COATING AND METHOD OF MAKING SAME

[75] Inventor: Edward A. Lasher, Beverly Hills, Calif.

[73] Assignee: Whittaker Corporation, Los Angeles, Calif.

[21] Appl. No.: 591,739

[22] Filed: June 30, 1975

Related U.S. Application Data

[62] Division of Ser. No. 331,228, Feb. 9, 1973, abandoned.

[51] Int. Cl.$^2$ .................. C08L 61/32; C08L 29/08
[52] U.S. Cl. .................. 260/850; 260/67.6 R; 260/851; 260/856; 427/388 B
[58] Field of Search ............................ 260/850

[56] References Cited

U.S. PATENT DOCUMENTS

| | | | |
|---|---|---|---|
| 3,163,615 | 12/1964 | Sekmakas | 260/850 |
| 3,402,219 | 9/1968 | Hill et al. | 260/850 |
| 3,428,479 | 2/1969 | Pobransky | 260/850 |
| 3,480,693 | 11/1969 | Hill et al. | 260/850 |
| 3,557,033 | 1/1971 | Brinton | 260/850 |
| 3,576,775 | 4/1971 | Jaegersberg | 260/850 |
| 3,691,258 | 9/1972 | Riemhofer et al. | 260/850 |

FOREIGN PATENT DOCUMENTS 1,081,665   5/1960   Germany.

*Primary Examiner*—John C. Bleutge
*Attorney, Agent, or Firm*—Donald E. Nist

[57] ABSTRACT

A polyester resin is made by esterifying a reaction mixture comprising specific amounts of a diol, a triol, an a cyclic dicarboxylic acid, an unsaturated, aliphatic dicarboxylic acid such as maleic acid and a saturated, aliphatic dicarboxylic acid.

The polyester resin is cross-linked with an aminoplast resin to produce a one-coat chemical coating which dispenses with the need to use a primer coat.

Another embodiment of this invention includes the use of a highly aromatic, polyhydroxy, low molecular weight polymer in the polyester resin formulation.

4 Claims, No Drawings

ONE-COAT POLYESTER-BASED COATING AND METHOD OF MAKING SAME

This is a division, of application Ser. No. 331,228, filed Feb. 9, 1973 now abandoned.

BACKGROUND OF THE INVENTION

This invention relates to polyester resins and paints or chemical coatings made therefrom and, more specifically, it relates to polyester resins useful in the preparation of chemical coatings which can be applied to umprimed surfaces.

Chemical coatings for use as can and coil (coiled metal sheet) coatings must exhibit both good flexibility and hardness and they must be capable of being applied in thin films without surface defects such as cratering, etc. Polyester coatings which meet these requirements are described in U.S. Pat. Nos. 3,714,090 and 3,714,091 issued Jan. 30, 1973 and Jan. 30, 1973, respectively. However, those coatings have to be applied over a primer coating in order to obtain the benefit of their improved properties.

Several different types of coatings are presently available for can and coil coating applications which do not employ a primer. These include acrylic, vinyl and polyester coatings. However, each of these types of coatings has several disadvantages.

The acrylic coatings, even though they are relatively expensive, must be used with high Kauri-Butanol (KB) solvents (KB ratings well in excess of 100) which often results in application problems such as streaking and cratering. Additionally, these coatings have a strong tendency to blister during baking (curing) and the cured coatings with the required flexibility are not as hard as is generally desired.

The vinyl-based coatings are also very expensive. Additionally, they are characterized by relatively poor exterior durability and have rapid dirt pickup.

The one-coat polyester coatings, although substantially less expensive than the vinyl and acrylic coatings, also require high KB solvents with attendant application problems resulting in cratering, etc. They also exhibit incompatibility problems with other materials such as those which might be present in coating tanks, etc., which have not been perfectly cleaned following an earlier run with a different composition.

SUMMARY OF THE INVENTION

A polyester resin is made by esterifying a reaction mixture comprising (1) a triol in an amount between about 5% and about 9% by weight of the total reaction mixture reactants weight, (2) a diol in an amount between about 34% and about 48% by weight, (3) a cyclic dicarboxylic acid in an amount between about 21% and 42% by weight, (4) an unsaturated, aliphatic dicarboxylic acid in an amount between about 6% and about 15% by weight, and (5) a saturated aliphatic polycarboxylic acid in an amount between about 16% and about 23% by weight.

The polyester resin is cross-linked with, e.g., an aminoplast resin, with the latter being utilized in amounts between about 5% and 25% by weight of the total weight of polyester and aminoplast resins.

A coating composition exhibiting improved boiling water resistance over highly curved surfaces can be produced by including about 0–12% by weight of a highly aromatic, polyhydroxy, low molecular weight polymer in the polyester resin formulation.

These coating compositions can be easily and uniformly applied to metal substrates using relatively weak solvents having KB values in the 90–100 range as compared with the need to use solvents having KB values well in excess of 100 with prior art coil coatings other than those described in the aforementioned patents of the instant inventor. Additionally, the herein-described coatings can be applied directly to a metal substrate without the need to use a primer coating. Adhesion to unprimed metal surfaces by the herein-described coatings is so good that use of a primer may result in less adhesion than that obtained without a primer.

These coatings are also characterized by excellent flexibility with good hardness so that the coated metal can be formed into complex shapes without chipping of the coating or peeling of the coating from the metal. Furthermore, the flexibility and adhesion characteristics prevent removal of these coatings from an unprimed substrate when taped at room temperature after being subjected to a 2T bend at room temperature and overbaked.

DESCRIPTION OF THE PREFERRED EMBODIMENT

As used herein and in the claims, all percents are weight percents and are a percentage of the total weight of the relevant reaction mixture reactants.

The polyester resin is made by esterifying a reaction mixture comprising specific amounts of (a) a diol, (b) a triol, (c) a cyclic dicarboxylic acid, (d) an unsaturated, aliphatic dicarboxylic acid, and (e) a saturated, aliphatic dicarboxylic acid or equivalent chemical structure to enhance flexibility. The resulting polyester resin is cross-linked with an aminoplast resin to produce the one-coat chemical coatings described herein.

Useful diols include: 1,2 and 1,3 propylene glycol; 1,3 and 1,4 butylene glycol; 1,5 pentane diol; 1,6 hexanediol; cyclohexane dimethanol; 2-ethyl,2-methyl,1,3 propane diol; neopentyl glycol; diethylene glycol; and dipropylene glycol. Useful triols include trimethylol ethane, trimethylol propane, trimethylol butane, hexanetriol, and pentanetriol.

The amount of polyol (diol plus triol) employed is a function of the amount of carboxylic acid. At least a stoichiometric amount of polyol is employed with respect to the amount of carboxylic acid. Preferably, about a 12%–20% excess of the polyol with respect to the stoichiometric amount of carboxylic acid is employed.

The amount of triol employed varies between about 5% and about 9% of the reaction mixture weight. Below about 5% of triol in the reaction mixture, the resulting polyester coating becomes too soft and has poor chemical resistance. Above about 9% of triol, the resulting polyester coating becomes increasingly insoluble in solvents having KB values on the order of 90 and exhibits flow problems when applied to a substrate.

The amount of diol employed varies between about 34% and about 48% by weight. Below about 34%, the uncured polyester coatings exhibit viscosity problems with attendant coating application problems. Above about 48%, the softness of the cured polyester films increases and the films exhibit poor chemical resistance.

The cyclic dicarboxylic acids include: orthophthalic acid, isophthalic acid, terephthalic acid, tetrahydrophthalic acid, hexahydrophthalic acid and endomethylene tetrahydrophthalic acid. The anhydrides of these and any other carboxylic acids employed herein may also be used. The cyclic polycarboxylic acids are used in amounts between about 21% and about 42% by weight. Below about 21% of a cyclic polycarboxylic acid, the cured films become too soft. Above about 42% of cyclic dicarboxylic acid, the uncured resin becomes too viscous and is difficult to apply smoothly and evenly to a substrate.

The unsaturated aliphatic dicarboxylic acids employed herein include: maleic acid, itaconic acid, fumaric acid, citraconic acid, mesoconic acid, and teraconic acid.

The amount of unsaturated, aliphatic dicarboxylic acid varies between about 6% and about 15% by weight. Below about 6%, adhesion of the cured films (polyester and aminoplast resins) to substrates is substantially reduced so that such a material will have a greater tendency to be removed from the substrate to which it has been applied when that substrate is subjected to bending or impact and the affected area is thereafter taped. Above about 15%, the cured film becomes too brittle and is not capable of flexing with the substrate as the latter is bent. As a result, the film would fracture at the bend.

The saturated aliphatic polycarboxylic acids employed herein have from 3 to 18 carbons and include: malonic acid, succinic acid, glutaric acid, adipic acid, suberic acid, azelaic acid, trimethyl adipic acid, sebacic acid and dodecyl succinic acid. Adipic acid is presently preferred because of its low cost, availability and the excellent results obtained from its use.

The saturated, aliphatic polycarboxylic acid is employed in amounts between about 16% and about 23%. Below about 16%, the cured films become brittle so that the film is not capable of flexing with the substrate. Above about 21%, the film does not have the required hardness.

The method employed to esterify the reactants to produce the polyester resin is well-known in the art. Briefly, the reactants are placed in a reaction vessel together with a solvent to facilitate refluxing and mixing. This mixture is preferably heated to a temperature which will cause the esterification reaction to proceed at a commercially, acceptable rate. For example, if the reaction mixture is raised to a temperature on the order of 400° F–450° F, the reaction is substantially completed in about 10–12 hours. Of course, higher or lower temperatures may be employed depending upon acceptable reaction times, the characteristics of the reactants, etc. To speed up the esterification reaction without necessarily using high temperatures, a suitable catalyst may be employed. For example, catalytic amounts of phosphoric acid may be included in the reaction mixture.

To prevent oxidation of the reactants and polyester resins, particularly at the higher temperatures, oxygen is preferably excluded from the reaction vessel. This may be accomplished by evacuating the reaction vessel at the start of the reaction, by maintaining an atmosphere in the reaction vessel which is inert to the reactants and resins, or by a combination of these. An inert atmosphere may be provided by bubbling a gas, for example, $CO_2$ gas, through the reaction mixture or by maintaining the gases produced during the reaction under a positive pressure in the reaction vessel.

The reaction mixture is preferably stirred throughout the reaction and is held at the desired elevated temperature until the esterification reaction is substantially complete. The latter can be determined by making a 50% (wt.) solution of the reaction solids in xylene and determining the viscosity of this solution. In general, this reaction will be substantially complete if the Gardner-Holdt viscosity of this solution is about I or higher up to about Y, although lower viscosities are acceptable where higher solids concentrations in the coatings are required. Preferably, the aforementioned xylene solution has an acid number of about 5 or less. The reaction product may be thinned to any desired solids concentration by the addition thereto of suitable solvents.

The solvents employed during the course of the reaction may include, for example, xylene, toluene, benzene and cyclohexanone. The solvents employed to thin the resulting reaction product may include, for example, any of the foregoing solvents as well as Amsco solvent G with a boiling range of 184° to 209° C and kauri-butanol value of 90 and Amsco solvent HC with a boiling range of 241° to 275° C and a kauri-butanol value of 98.

The resulting polyester resins are preferably cross-linked with an aminoplast resin to produce the one-coat chemical coatings. The aminoplast resins include, for example, butylated urea-formaldehyde resins, butylated melamine-formaldehyde resins, hexamethoxymethylmelamine or mixtures of various hydroxymethyl-melamine-methyl ethers such as the pentamethyoxymethylmelamine and the tetramethoxymethyl melamines. The hydroxymethylmelamine and hydroxymethyl ureas may also be etherified with alcohols other than methyl or butyl such as ethyl, propyl, isobutyl and isopropyl. Preferably, hexamethoxymethylmelamine alone or in combination with butylated melamine resin is employed. The amount of aminoplast employed with the polyester resin is about 5% to about 25% by weight of the weight of total resin solids in the mixture. Above about 25%, the cured resin mixture shows a significant decrease in flexibility.

Coatings made as described exhibit excellent adhesion, flexibility, hardness, and chemical resistance. However, a further improvement can be obtained in the resistance of these coatings to boiling water when subjected to severe bending, as when the substrate to which they are applied is severely bent to form an article. This improvement is obtained by including up to about 12% by weight of a highly aromatic, polyhydroxy, low molecular weight polymer in the polyester formulation together with components (a)–(e). Above about 12%, embrittlement of the coating composition occurs. An example of such a polymer is the styrene-allyl alcohol copolymer having a molecular weight of about 1600, a styrene/allyl alcohol ratio of about 3:1, and which is marketed under the trademark RJ-100.

This invention will now be further described by the following Examples. In each of these Examples, the term "parts" is parts by weight.

EXAMPLE 1

A polyester resin was made as described herein and a paint was made therefrom as follows.

The following reactants were charged to a reaction vessel fitted with stirrer, heater and temperature indicator: trimethylol propane — 183 parts (by weight); neopentyl glycol — 840 parts; adipic acid — 490 parts; itaconic acid — 235 parts; phthalic anhydride — 512 parts; and an 85% solution of phosphoric acid as catalyst — 4.5 parts. Amsco B solvent was added to this reaction mixture as a reflux solvent. A carbon dioxide atmosphere was produced in the reaction vessel by bubbling carbon dioxide gas through the reaction mixture. The latter was heated rapidly (in 1 hr.) to about 300° F and then slowly to 464° F over the next nine hours at which time heating was discontinued. Amsco G solvent and 194 parts of RJ-100 (a styrene-allyl alcohol copolymer of molecular weight of about 1600) were then added and heating thereafter continued for about 40 minutes at a reduced temperature of 385° F -425° F.

The resulting polyester resin was thinned to 60% solids using a solvent mixture of 4.5% (by volume) Amsco B, 85.5% Amsco G, and 10% butanol. This solution had a Y-Z viscosity and the solids had an acid number of 8.9.

A paint was made from this polyester resin by first mixing 13.2 parts (by weight) of the 60% resin solution with 26.3 parts of titanium dioxide (Dupont R966), 4.4 parts of butyl cellulose acetate, and 2.2 parts of 2-ethyl hexanol in a ball mill and milling until a particle size of at least 7H was obtained. To the resulting mixture, there was added with stirring: 30.2 parts of the same 60% solids polyester resin solution; 3.2 parts of Cymel #370 (100% hexamethoxy melamine); 1.3 parts of Resimene #891 (60% butylated melamine); 2.9 parts of a 13% solids wax dispersion (paraffinic wax); 5.9 parts of Amsco G solvent; 5.9 parts butyl carbitol acetate; and 4.8 parts of 2-ethyl hexanol.

The resulting resin formulation was applied, with excellent flow, to a bare aluminum panel and cured at 600° F for 30 seconds. The cured paint showed only very slight microscopic fracture when this panel was subjected to a 1T bend. There was no tape-off at the bend. This panel was subjected to a 32 lb. reverse impact test. The paint was taped at the impact point, but there was no tape-off. Then this bent and impacted panel was immersed in boiling water for 20 min. The result was that the 1T bend fracture area increased slightly. The tape-off over the bend was about 60%. This is to be compared with competitive acrylic paints. The latter would substantially tape off over a 2T bend without being subjected to boiling water treatment.

EXAMPLE 2

A polyester resin using maleic acid in place of itaconic acid was made using substantially the same procedure as described in Example 1 except that the catalyst was included in the initial reaction mixture.

The reaction mixture included: trimethylol propane — 109.6 parts; neopentyl glycol — 906.4 parts; phthalic anhydride — 570.5 parts; maleic anhydride — 219.1 parts; adipic acid — 394.5 parts; and 85% phosphoric acid solution — 11 parts. The resulting cooled polyester resin was thinned to 60% solids with a solvent mixture comprising 6.2% (by volume) Amsco B, 85.8% Amsco G, and 8% n-butanol. This 60% solids solution had a Z-Z1 viscosity and an acid no. on the solids of 8.4.

The resulting polyester resin solution was used to formulate a paint composition using the same amounts and constituents as are described in the paint formulation of Example 1 with the exception, of course, of the polyester resin itself. The paint so made was applied to an aluminum panel and subjected to the same tests as the paint in Example 1 with substantially the same results. In this Example, the cured paint film had a hardness of H- as compared with the F hardness of the cured paint in Example 1.

EXAMPLE 3

A polyester resin was made from the following reactants: maleic anhydride — 196 parts (by weight); adipic acid — 490 parts; phthalic anhydride — 512 parts; neopentyl glycol — 840 parts; trimethylolpropane — 183 parts; 85% phosphoric acid solution — 4.45 parts; RJ-100 (Styrene-allyl alcohol copolymer w/m.w. of about 1600)-194 parts. The procedure used was substantially the same as described in the making of the polyester resin of Example 1.

The resin was thinned to 60% solids using a solvent composition comprising 5.4% (by volume) of Amsco B, 79.6% Amsco G, and 15% butanol. This solution has a viscosity of Z2+ and an acid number of 9.58 on the solids.

A white paint was formulated from this polyester resin by first mixing 13 parts (by weight) of this 60% polyester resin solution with 9.3 parts of Amsco G, 3 parts of butyl carbitol acetate, and 22.7 parts of titanium dioxide. This mixture was milled in a sand mill to a particle size of at least 7H. To this mixture, it was added with stirring 35.81 parts of the 60% polyester resin solution, 3 parts of a 50% hexamethoxymethyl melamine solution, 1.08 parts of a 60% butylated melamine solution, 4 parts of Amsco G, 5.11 parts of Amsco HC, 1 part of 2-ethyl hexanol and 2 parts of a 13% paraffinic wax dispersion.

This mixture was cooled on a bare aluminum panel at 600° F for one minute to produce a film thickness of 0.75 mil. This cooled panel was subjected to a 1T bend and a 32 in lb. reverse impact test with very good results. That is, the film remained substantially unbroken and adhered strongly to the underlying metal at the bend and impact locations. Thereafter, this panel was heated to 170° F for 2 hrs. and still there was no cracking at the 1T bend. The film itself had a hardness of H-.

In the claims which follow, the expression "% by weight" shall mean "% by weight of the total weight of reactants (a) to (f)", unless otherwise indicated. It will also be understood that either a single member or a combination of members of a component may be employed. For example, dipropylene glycol may be used alone or in combination with other identified diols as the diol component.

I claim:
1. A method of making a one-coat, coatings formulation, comprising the steps of: esterifying a reaction mixture comprising
   a. about 5% to about 9% by weight of a triol selected from the group consisting of trimethylol ethane, trimethylol propane, trimethylol butane, hexanetriol and pentanetriol,
   b. about 35% to about 48% by weight of a diol selected from the group consisting of 1,2 and 1,3 propylene glycol, 1,3 and 1,4 butylene glycol, 1,5 pentane diol, 1,6 hexanediol, cyclohexane dimethanol, 2-ethyl, 2-methyl, 1,3 propane diol, neopentyl glycol, diethylene glycol and dipropylene glycol,
   c. about 21% to about 42% by weight of a cyclic dicarboxylic acid selected from the group consisting of orthophthalic acid, isophthalic acid, terephthalic acid, tetrahydrophthalic acid, hexahydrophthalic acid, endomethylene tetrahydrophthalic acid, and anhydrides thereof,
   d. about 5% to 15% by weight of an unsaturated aliphatic dicarboxylic acid selected from the group consisting of maleic acid, itaconic acid, fumaric acid, citraconic acid, mesoconic acid, teraconic acid, and anhydrides thereof,
e. about 16% to about 23% by weight of a saturated, aliphatic dicarboxylic acid selected from the group consisting of malonic acid, succinic acid, glutaric acid, adipic acid, suberic acid, azelaic acid, trimethyl adipic acid, sebacic acid, dodecyl succinic acid and anhydrides thereof, and then reacting the resulting first, polyester resin obtained by said esterification with
f. a styrene-allyl alcohol copolymer having a molecular weight of about 1600 and a styrene/allyl alcohol weight ratio of about 3:1, and being present in an amount up to about 12% by weight sufficient to provide improved coating resistance to boiling water when subjected to severe bending, to produce a second polyester resin; and reacting said second polyester resin with an aminoplast resin, with the latter being present in an amount between about 5% and about 25% by weight of the total weight of said second polyester and aminoplast resins, to cross-link said second polyester resin.

2. The method of claim 1 wherein said reactants are heated in an atmosphere inert to said reactants.

3. The method of claim 1 wherein said reaction mixture includes a solvent for said reactants.

4. The product made according to the method of claim 1.

* * * * *